(12) United States Patent
Alkalay et al.

(10) Patent No.: US 12,072,827 B2
(45) Date of Patent: Aug. 27, 2024

(54) SCALING MIDPLANE BANDWIDTH BETWEEN STORAGE PROCESSORS VIA NETWORK DEVICES

(71) Applicant: Dell Products L.P., Round Rock, TX (US)

(72) Inventors: Amitai Alkalay, Kadima (IL); Aric Hadav, Tel Aviv (IL); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 17/971,795

(22) Filed: Oct. 24, 2022

(65) Prior Publication Data

US 2024/0134814 A1 Apr. 25, 2024
US 2024/0232119 A9 Jul. 11, 2024

(51) Int. Cl.
*G06F 13/40* (2006.01)
*G06F 13/42* (2006.01)

(52) U.S. Cl.
CPC ........ *G06F 13/409* (2013.01); *G06F 13/4068* (2013.01); *G06F 13/4221* (2013.01)

(58) Field of Classification Search
CPC . G06F 13/4068; G06F 13/4221; G06F 13/409
See application file for complete search history.

(56) References Cited

U.S. PATENT DOCUMENTS

| | | | |
|---|---|---|---|
| 9,026,708 B1 | 5/2015 | Fenton et al. | |
| 9,092,583 B2 * | 7/2015 | Boyd | G06F 13/409 |
| 9,560,793 B2 * | 1/2017 | Leigh | G06F 1/20 |
| 9,703,744 B2 | 7/2017 | Tanaka et al. | |
| 9,836,309 B2 * | 12/2017 | Lambert | G06F 13/4022 |
| 9,940,280 B1 | 4/2018 | O'Brien et al. | |
| 10,359,815 B1 | 7/2019 | Lin et al. | |
| 10,694,635 B1 | 6/2020 | Rivnay | |
| 10,721,832 B2 | 7/2020 | Nelson et al. | |
| 10,860,514 B2 | 12/2020 | Zhai et al. | |
| 10,963,023 B1 | 3/2021 | Zheng et al. | |
| 11,281,398 B1 | 3/2022 | Zheng | |
| 11,314,666 B2 | 4/2022 | Aharony et al. | |
| 11,422,731 B1 | 8/2022 | Potashnik et al. | |
| 11,423,180 B2 | 8/2022 | Young et al. | |
| 11,442,231 B2 * | 9/2022 | Leigh | G02B 6/3825 |
| 11,596,073 B2 * | 2/2023 | Zhang | G06F 1/187 |
| 2004/0136334 A1 * | 7/2004 | Heiman | H04B 7/2123 370/316 |
| 2008/0239649 A1 | 10/2008 | Bradicich et al. | |

(Continued)

*Primary Examiner* — Henry Tsai
*Assistant Examiner* — Christopher A Daley
(74) *Attorney, Agent, or Firm* — BainwoodHuang

(57) ABSTRACT

Techniques provide communications bandwidth between storage processors (SPs). Such techniques involve electrically coupling the SPs with a first side of a midplane. Such techniques further involve electrically coupling a network interface controller (NIC) device with a second side of the midplane that is opposite the first side of the midplane. Such techniques further involve configuring the NIC device to convey communications between the SPs while the SPs are electrically coupled with the first side of the midplane and while the NIC device is electrically coupled with the second side of the midplane that is opposite the first side of the midplane.

20 Claims, 10 Drawing Sheets

(56) References Cited

U.S. PATENT DOCUMENTS

| | | | |
|---|---|---|---|
| 2012/0170191 A1* | 7/2012 | Jensen | G06F 1/183 |
| | | | 361/679.02 |
| 2013/0282944 A1* | 10/2013 | Shaw | G06F 1/186 |
| | | | 710/305 |
| 2014/0281094 A1* | 9/2014 | Nelson | G06F 13/4068 |
| | | | 710/301 |
| 2015/0317272 A1 | 11/2015 | Tanaka et al. | |
| 2016/0073544 A1 | 3/2016 | Heyd et al. | |
| 2016/0077841 A1* | 3/2016 | Lambert | G06F 9/4411 |
| | | | 713/2 |
| 2017/0262029 A1 | 9/2017 | Nelson et al. | |
| 2017/0269871 A1 | 9/2017 | Khan et al. | |
| 2017/0346205 A1 | 11/2017 | Eriksson et al. | |
| 2018/0090865 A1 | 3/2018 | Huang et al. | |
| 2019/0098788 A1* | 3/2019 | Leigh | H05K 7/1492 |
| 2019/0104632 A1 | 4/2019 | Nelson et al. | |
| 2020/0183862 A1 | 6/2020 | Liu et al. | |
| 2020/0192439 A1* | 6/2020 | Lin | H05K 1/141 |
| 2020/0196437 A1* | 6/2020 | Weng | H05K 1/0245 |
| 2021/0007235 A1 | 1/2021 | Nelson et al. | |
| 2021/0084787 A1 | 3/2021 | Weldon et al. | |
| 2021/0127529 A1 | 4/2021 | Hanna et al. | |
| 2022/0207185 A1 | 6/2022 | Young et al. | |
| 2022/0236884 A1 | 7/2022 | Zhang et al. | |

\* cited by examiner

SCALING MIDPLANE BANDWIDTH BETWEEN STORAGE PROCESSORS VIA NETWORK DEVICES

BACKGROUND

A conventional data storage system includes a storage system chassis, a midplane interconnect, storage processor modules, and dual port disk drives. The storage system chassis holds the midplane interconnect within an internal middle region of the chassis so that the storage processor modules can insert into the chassis through one chassis opening at one end to connect to one side of the midplane interconnect, and so that the dual port disk drives can insert into the chassis through another chassis opening at the other end to connect to an opposite side of the midplane interconnect.

Once the storage processor modules and dual port disk drives are inserted into the chassis and electrically connected with the midplane interconnect, the storage processors modules are able to communicate with each other through first midplane pathways that connect the storage processor modules directly to each other. Additionally, the storage processors modules are able to communicate with each dual port disk drive through second midplane pathways that connect the storage processor modules directly to that dual port disk drive. During data storage system operation, the storage processors communicate with each other via Ethernet communications through the first midplane pathways, and the storage processors communicate with the dual port disk drives via Peripheral Component Interconnect Express (PCIe) communications through the second midplane pathways.

SUMMARY

Unfortunately, in the above-described conventional data storage system, the bandwidth between the storage processors modules is limited to that which is provided by the first midplane pathways that connect the storage processor modules directly to each other. Along these lines, the first midplane pathways are able to convey only a limited amount of data during a set amount of time. Nevertheless, there may be advancements in storage processor module technology that could provide benefits/advantages if there is greater bandwidth between the storage processors modules (e.g., due to advancements in storage processor module throughput, due to faster storage processor module operating speeds, combinations thereof, etc.).

In contrast to the above-described conventional data storage system in which the bandwidth between the storage processors modules is limited to that which is provided by the first midplane pathways that connect the storage processor modules directly to each other, improved techniques are directed to scaling midplane bandwidth between storage processors (SPs) via network devices. In particular, the SPs may communicate with each other directly through first midplane traces of a midplane, and further through second midplane traces of the midplane and a set of network interface controller (NIC) devices. In accordance with certain embodiments, a NIC device may have a form factor that is similar to that of a storage drive and thus be able to insert into a storage drive slot in place of a storage drive. For example, the NIC device may operate to convey communications between the SPs while the SPs are electrically coupled with one side of the midplane and while a NIC device is electrically coupled with the other side of the midplane.

One embodiment is directed to a method of providing communications bandwidth between SPs. The method includes electrically coupling the SPs with a midplane. The method further includes electrically coupling a network interface controller (NIC) device with the midplane. The method further includes configuring the NIC device to convey communications between the SPs while the SPs are electrically coupled with the midplane and while the NIC device is electrically coupled with the midplane.

Another embodiment is directed to data storage equipment which includes a midplane, SPs constructed and arranged to electrically couple with the midplane, and a NIC device constructed and arranged to electrically couple with the midplane. The NIC device is configurable to convey communications between the SPs while the SPs are electrically coupled with the midplane and while the NIC device is electrically coupled with the midplane.

In some arrangements, electrically coupling the SPs with the midplane includes electrically coupling the SPs with a first side of a midplane. Additionally, electrically coupling the NIC device with the midplane includes electrically coupling the NIC device with a second side of the midplane that is opposite the first side of the midplane. Furthermore, configuring the NIC device to convey communications between the SPs includes, while a first network connection is established between the SPs through a first set of traces of the midplane, establishing a second network connection between the SPs through a second set of traces of the midplane and the NIC device, the second set of traces being different from the first set of traces.

In some arrangements, the midplane resides within a drive processor enclosure (DPE). Additionally, electrically coupling the NIC device with the second side of the midplane includes installing the NIC device within a storage drive slot defined by the DPE, the storage drive slot being constructed and arranged to hold a storage drive.

In some arrangements, prior to installing the NIC device within the storage drive slot defined by the DPE, a storage drive is uninstalled from the storage drive slot defined by the DPE.

In some arrangements, the SPs include a first SP and a second SP. Additionally, the storage drive is a dual port storage device constructed and arranged to communicate with the first SP through a first port that connects with first midplane conductors and with the second SP through a second port that connects with second midplane conductors. Furthermore, uninstalling the storage drive from the storage drive slot defined by the DPE includes disconnecting the dual port storage device from the first and second midplane conductors. Also, installing the NIC device within the storage drive slot defined by the DPE includes connecting the NIC device to the first and second midplane conductors.

In some arrangements, after the second network connection between the SPs is established, Ethernet communications are conveyed between the SPs through the midplane and the NIC device.

In some arrangements, the SPs includes a first SP and a second SP. Additionally, conveying Ethernet communications between the SPs through the midplane and the NIC device includes:

(i) conveying first Peripheral Component Interconnect Express (PCIe) signals between the first SP and a first NIC controller of the NIC device, (ii) conveying second PCIe signals between the second SP and a second NIC controller of the NIC device, and (iii) conveying Ethernet signals through a set of NIC traces interconnecting the first NIC controller and the second NIC controller.

In some arrangements, the SPs includes a first SP and a second SP. Additionally, conveying Ethernet communications between the SPs through the midplane and the NIC device includes:

(i) conveying first Peripheral Component Interconnect Express (PCIe) signals between the first SP and an Ethernet multi-host controller of the NIC device, and (ii) conveying second PCIe signals between the second SP and the Ethernet multi-host controller of the NIC device, the Ethernet multi-host controller being constructed and arranged to internally provide Ethernet connectivity between the first and second SPs based on the first and second PCIe signals.

In some arrangements, the midplane resides within a DPE, and the NIC device is a first physical network interface. Additionally, electrically coupling the NIC device with the second side of the midplane includes installing the first physical network interface within a first device slot defined by the DPE. Furthermore, a second physical network interface is installed within a second device slot defined by the DPE, the second physical network interface being another NIC device that electrically couples with the second side of the midplane when the second physical network interface is installed within the second device slot defined by the DPE.

In some arrangements, after the first physical network interface is installed within the first device slot and the second physical network interface is installed within the second device slot, a network bonding operation is performed to form a logical network interface that aggregates networking capabilities of the first physical network interface and the second physical network interface.

In some arrangements, prior to installing the second physical network interface within the second device slot defined by the DPE, a storage drive is uninstalled from the second device slot defined by the DPE.

In some arrangements, after installing the second physical network interface within the second device slot defined by the DPE, the second physical network interface is uninstalled from the second device slot defined by the DPE and then installing a storage drive within the second device slot defined by the DPE.

It should be understood that, in the cloud context, at least some of electronic circuitry is formed by remote computer resources distributed over a network (e.g., additional SPs, hosts, etc.). Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic assemblies, components and circuitry which are involved in scaling (or aggregating) midplane bandwidth between storage processors via network devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to scaling midplane bandwidth between storage processors (SPs) via a network device. In particular, the SPs may communicate with each other directly through first midplane traces of a midplane, and further through second midplane traces of the midplane and a set of network interface controller (NIC) devices. In accordance with certain embodiments, the NIC device may have a form factor that is similar to that of a storage drive and thus be able to insert into a storage drive slot in place of a storage drive. For example, the NIC device may operate to convey communications between the SPs while the SPs are electrically coupled with one side of the midplane and while a NIC device is electrically coupled with the other side of the midplane. In accordance with some embodiments, multiple NIC devices may be installed to provide greater bandwidth through the midplane, and the bandwidth may be managed via a bonding operation performed by the SPs.

Figure 1:
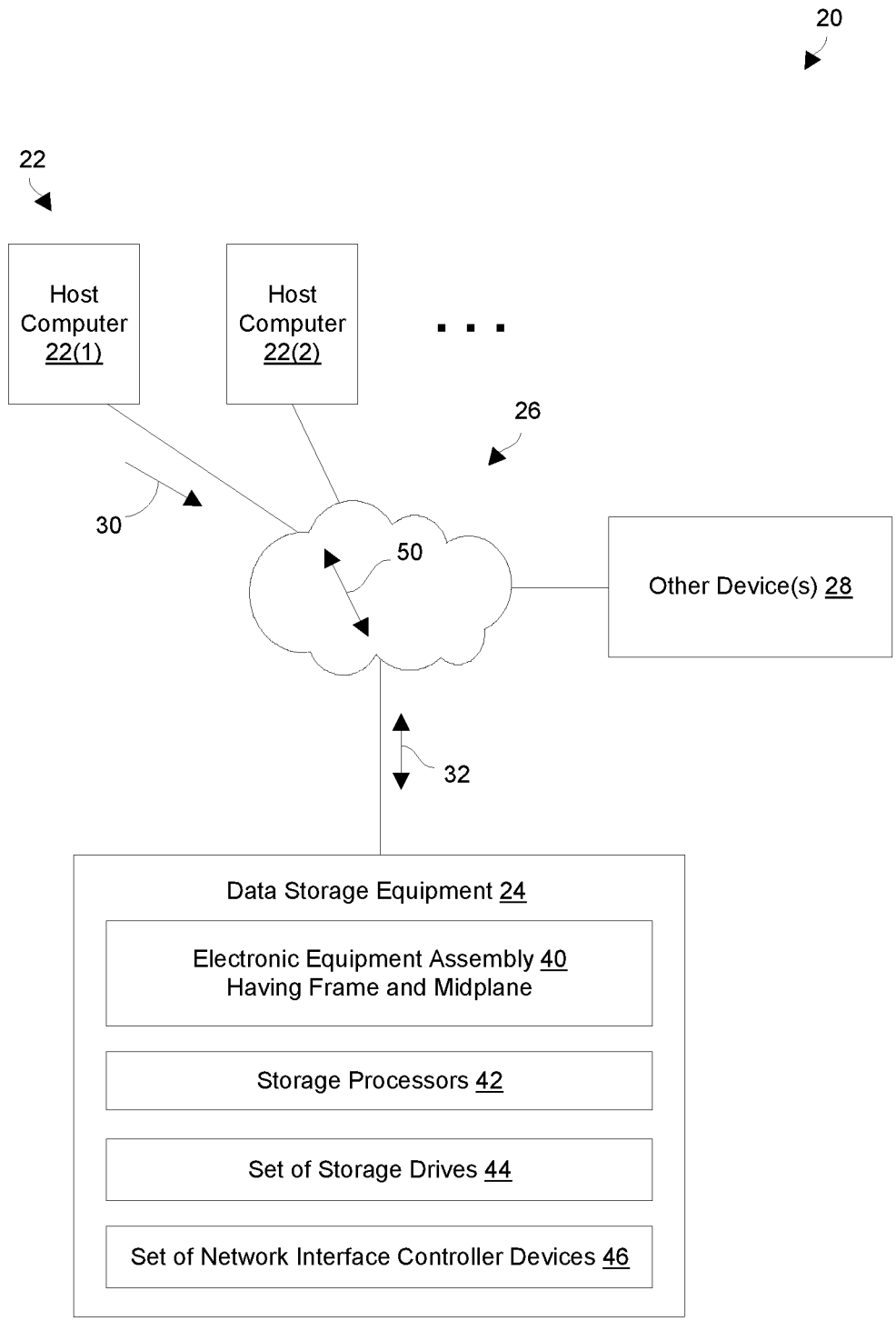
FIG. 1 is a block diagram of an electronic setting that scales midplane bandwidth between SPs via network devices in accordance with certain embodiments.

FIG. 1 shows an electronic setting 20 which includes data storage equipment that is capable of scaling midplane bandwidth between SPs via network devices in accordance with certain embodiments. By way of example, the electronic setting 20 is a data storage environment that includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage, tiered storage, combinations thereof, etc.).

The data storage equipment 24 is an example of electronic equipment that is capable of scaling midplane bandwidth via a set of NIC devices. The data storage equipment 24 includes an electronic equipment assembly 40, SPs 42, a set of storage drives 44, and a set of NIC devices 46.

The electronic equipment assembly 40 is constructed and arranged to support operation of various components of the data storage equipment 24. To this end, the electronic equipment assembly 40 provides connectivity among the various components, conveys power signals from power converters to the various components, positions fans along air pathways to provide cooling to the various components (i.e., to remove heat), protects the various components against tampering, damage, and so on.

As will be explained in further detail shortly, the electronic equipment assembly includes a frame (e.g., rack sections, a housing, an enclosure, chassis sections, combinations thereof, etc.), and a midplane which is disposed within the frame and which connects with the SPs 42, the set of storage drives 44, and the set of NIC devices 46. Additionally, the frame and midplane are configured to receive the SPs 42 through a first opening (e.g., via a rear of the electronic equipment assembly 40), and storage devices 44 and NIC devices 46 through a second opening opposite the first opening (e.g., via a front of the electronic equipment assembly 40).

The SPs 42 are constructed and arranged to respond to the host I/O requests 30 received from the host computers 22 by writing data into the set of storage drives 44 and reading the data from the set of storage drives 44. The SPs 42 may also be referred to as physical storage processing modules or engines, data movers, director boards, blades, etc. In accordance with certain embodiments, the SPs 42 may include a variety of specialized subcomponents such as cache memory to operate as read and/or write caches, on-board NICs to provide communications between the SPs 42 and/or external devices, LEDs and switches for local I/O, and so on.

The set of storage drives 44 is constructed and arranged to store data within the data storage equipment 24. In accordance with certain embodiments, the set of storage devices 44 may arrange the data in accordance with one or more data protection schemes (e.g., RAID1, RAID5, RAID6, RAID10, etc.). Example storage drives 44 include dual ported storage devices such as RAM devices, NVRAM devices, other solid state memory devices, hard disk drives (HDDs), combinations thereof, and so on.

The set of NIC devices 46 is constructed and arranged to provide communications for the data storage equipment 24. As will be explained in further detail shortly, the NIC devices 46 (e.g., shared Ethernet devices) have a form factor which is similar to that of the storage drives 44 thus enabling the NIC devices 46 to install within the same storage drive slots provided by the frame that are used by the storage drives 44. Accordingly, if there is an unused storage drive slot, a NIC device 46 may be installed within that storage drive slot to increase the bandwidth between the SPs 40.

In accordance with some embodiments, the storage drives 44 and the NIC devices 46 have form factors that comply with the Enterprise and Data Center Solid State Device Form Factor (EDSFF) E3 Specification. However, other form factors are suitable for use as well.

The communications medium 26 is constructed and arranged to connect the various components of the electronic setting 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the electronic setting 20. Along these lines, the other devices 28 may include remote data storage equipment that provides data to and/or receives data from the data storage equipment 24 (e.g., replication arrays, backup and/or archiving equipment, service processors and/or management/control devices, etc.). Such other devices 28 may also be provisioned with componentry similar to that of the data storage equipment 24 to enable scaling of midplane bandwidth via a set of NIC devices 44 in a manner similar to that of the data storage equipment 24. Further details will now be provided with reference to FIGS. 2 and 3.

Figure 2:
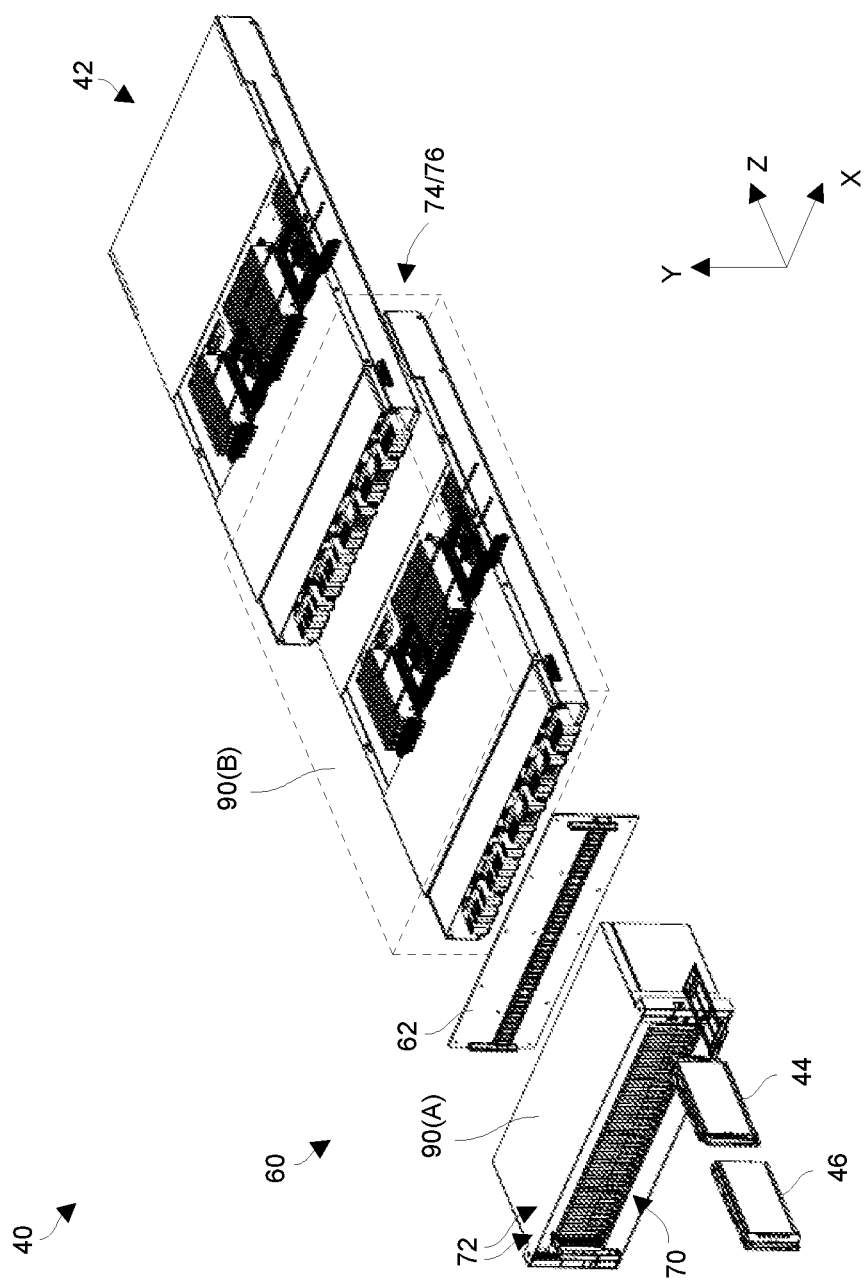
FIG. 2 is a perspective view of a drive processor enclosure (DPE) in accordance with certain embodiments.
Figure 3:
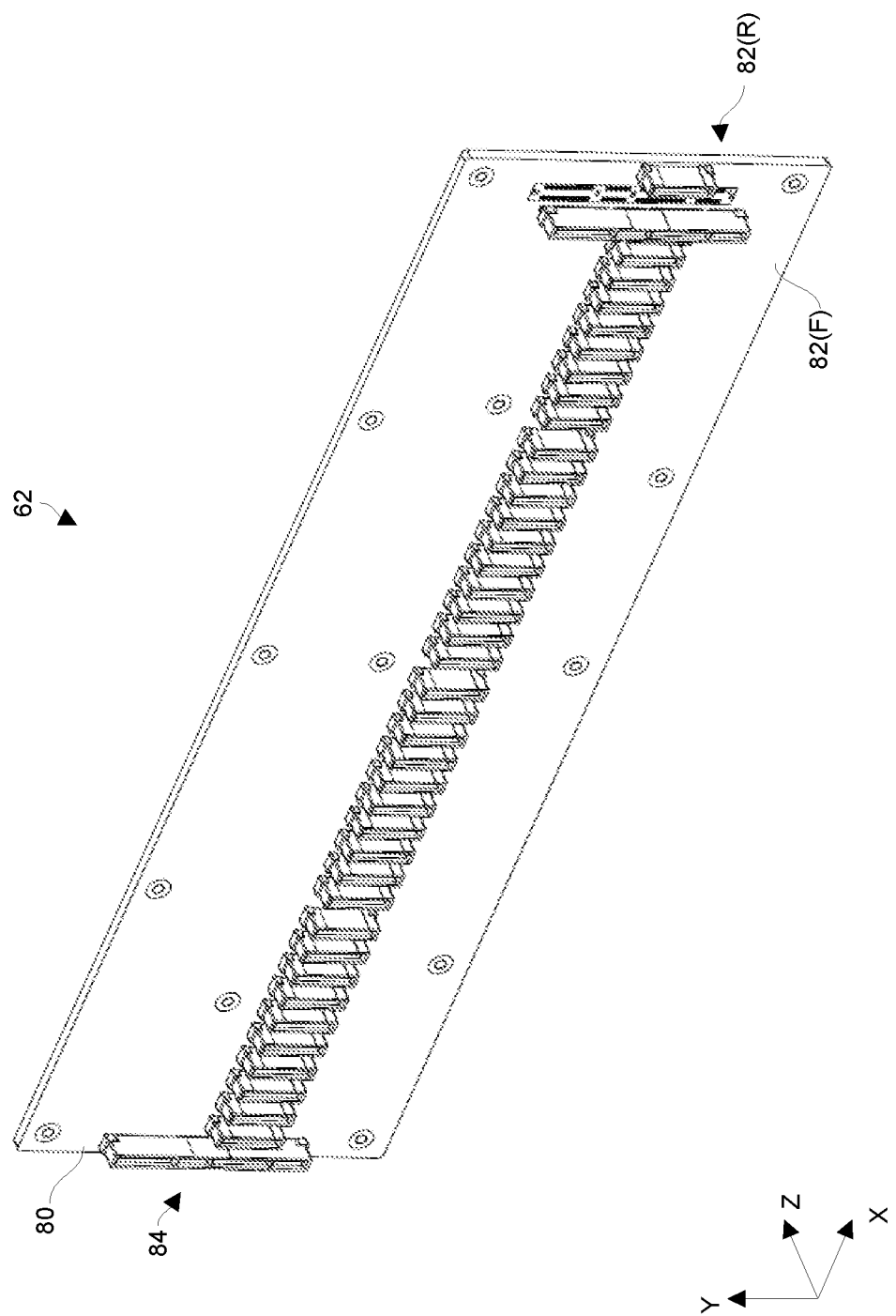
FIG. 3 is a perspective view of a midplane in accordance with certain embodiments.

FIGS. 2 and 3 show further electronic equipment details in accordance with certain embodiments. FIG. 2 shows a perspective exploded view of a portion of the data storage equipment 24 in accordance with certain embodiments. FIG. 3 shows certain midplane details in accordance with certain embodiments.

As shown in FIGS. 2 and 3, the electronic equipment assembly 40 includes a frame (or framework) 60 and a midplane 62 which mainly resides within an interior region (or area) of the frame 60. Once the various components of the electronic equipment assembly 40 are properly connected together, the electronic equipment assembly 40 serves as at least a portion of a drive processor enclosure (DPE), i.e., an assembly of modular storage system components such as drives, storage processors, etc. constructed and arranged to provide data storage on behalf of a set of hosts (e.g., see the host computers 22 in FIG. 1).

As best seen in FIG. 2, the frame 60 defines a front opening 70 having storage drive slots 72 to receive multiple storage drives 44. Additionally, the frame 60 defines a rear opening 74 having SP slots 76 to receive multiple SPs 42. By way of example, the storage drive slots 72 extend vertically along the Y-axis, and the SP slots 76 extend horizontally along the X-axis.

As best seen in FIG. 3, the midplane 62 includes a plane-shaped structure 80 (e.g., a multi-layered printed circuit board) having a front side 82(F) and a rear side 82(R) that is opposite the front side 82(F) and which extend in respective X-Y planes. The midplane 62 may further have other componentry 84 mounted to the plane-shaped connecting structure 80 such as connectors, guide posts/pins, power conditioning circuitry, and so on. It should be understood that the connectors shown in FIG. 3 are by way of example only and that other componentry, arrangements, layouts, etc. are suitable for use as well.

To install a storage drive 44 within a storage drive slot 72 defined by the frame 60, a user aligns the storage drive 44 with the storage drive slot 72, and pushes the storage drive 44 through the front opening 70 in the positive Z-direction until the storage drive 44 electrically couples with the front side 82(F) of the midplane 62 (FIG. 3). Similarly, to install a SP 42 within a SP slot 76, the user aligns the SP 42 with the SP slot 76, and pushes the SP 42 through the rear opening 74 in the negative Z-direction until the SP 42 electrically couples with the rear side 82(R) of the midplane 62 that is opposite the front side 82(F) (FIG. 3).

In some arrangements, the various components of the electronic equipment assembly 40 includes actuating features (e.g., levers, arms, latches, tabs, nubs, etc.) that enable the user to properly align and/or lock in place the storage drives 44 and/or the SPs 42. In some arrangements, the frame 60 includes separate a front frame section 90(A) for the storage drives 44, and a separate rear frame section 90(B) (illustrated in phantom in FIG. 2) for the SPs 42. Such separate frame sections 90(A), 90(B) facilitate positioning of the midplane 62 relative to the various slots 72, 76 defined by the frame 60 for improved alignment with the midplane 62.

As explained earlier and as will be explained in further detail below, a NIC device 46 may be installed within a storage drive slot 72 defined by the frame 60 (e.g., by inserting the NIC device 46 into the storage drive slot 72 in the positive Z-direction in a manner similar to that for a storage drive 44). For example, if there is an unused storage drive slot 72, a user may install a NIC device 46 within that storage drive slot 72 to increase the bandwidth between the SPs 42. As another example, if the user prefers higher connectivity between the SPs 42 over available storage (e.g., to optimize various DPE throughput), the user may uninstall a storage drive 44 from a storage drive slot 72 defined by the frame 60 and install a NIC device 46 in place of the uninstalled storage drive 44.

Once a NIC device 46 is installed within a storage drive slot 72, the NIC device 46 is able to utilize the same midplane traces to the SPs 42 as used by a storage drive 44. That is, recall that the storage drives 44 are multiport storage devices having a separate port and separate midplane traces to each SP 42. Similarly, the NIC device 46 has multiple ports, i.e., one port to each SP 42 through the midplane 62 using the same midplane traces used by a storage device 44. Accordingly, the NIC device 46 is well positioned and capable of conveying communications (e.g., data, commands, status, combinations thereof, etc.) between the SPs 42.

It should be understood that the SPs 42 are described as installed through the rear (or back) of the frame 60, and the storage devices 44 and the NIC devices 46 are described as installing through the front of the frame 60 by way of example. However, nothing precludes other installation arrangements.

For example, in accordance with certain embodiments, one or more SPs 42 and one or more devices 44, 46 install through the front of the frame 60. As another example, in accordance with certain embodiments, one or more SPs 42 and one or more devices 44, 46 may install through the rear of the frame 60. It should be understood that, there are no physical constraints to how and/or where the SPs 42 and the devices 44, 46 connect with the midplane 62, but that simply a "dual port" NIC device 46 replaces dual port storage device 44 to increase bandwidth through the midplane 62 between the SPs. Further details will now be provided with reference to FIGS. 4 through 6.

Figure 4:
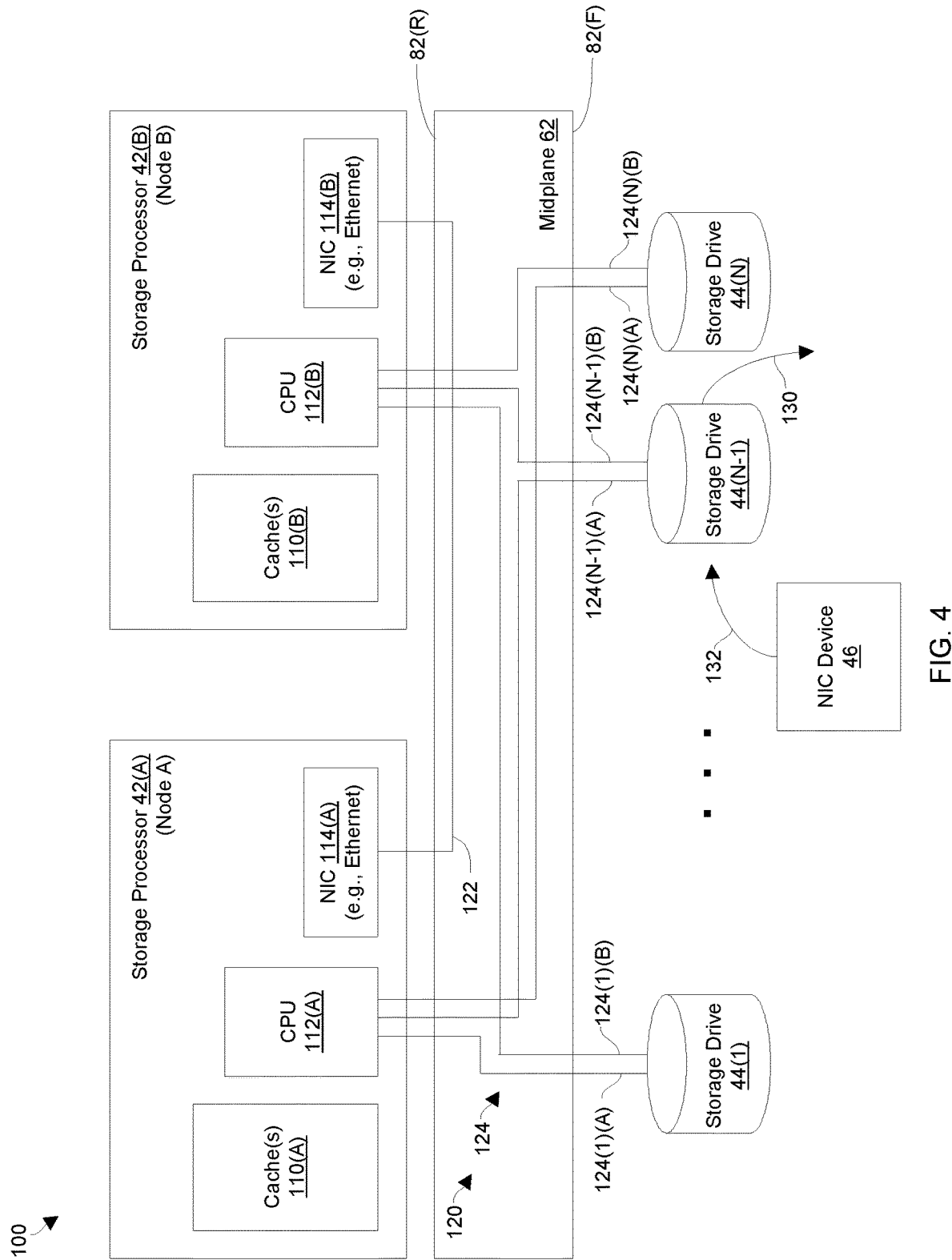
FIG. 4 is a block diagram of particular scaling details in accordance with certain embodiments.
Figure 5:
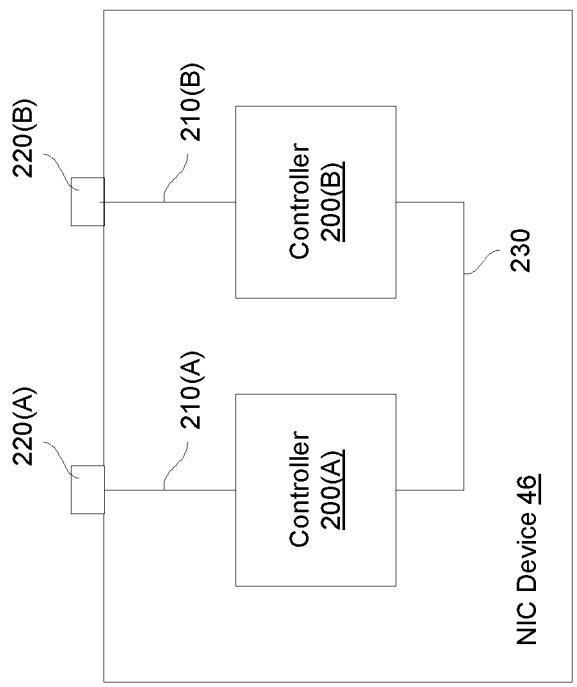
FIG. 5 is a block diagram of a first example NIC device in accordance with certain embodiments.
Figure 6:
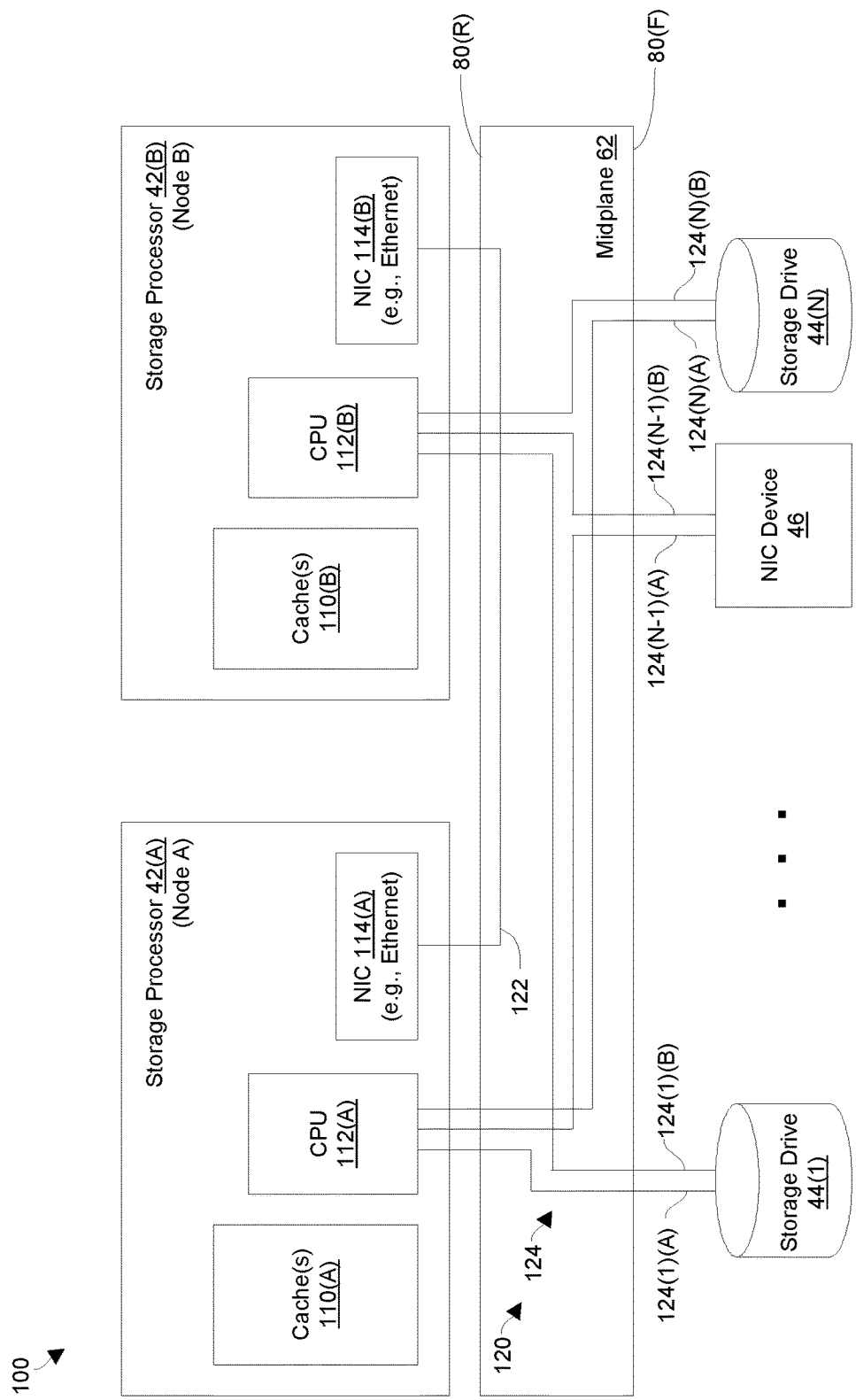
FIG. 6 is a block diagram of additional scaling details in accordance with certain embodiments.

FIGS. 4 through 6 show particular details for scaling bandwidth between SPs 42 of a DPE 100 in accordance with certain embodiments (also see the data storage equipment 24 in FIG. 1 and the electronic equipment assembly 40 in FIG. 2). FIG. 4 shows the DPE 100 prior to replacement of a storage device 44 with a NIC device 46. FIG. 5 shows details of an example NIC device 46. FIG. 6 shows the DPE 100 after replacement of the storage device 44 with the NIC device 46.

As shown in FIG. 4, the midplane 62 of the DPE 100 has a front side 82(F) which faces and electrically couples with a set of storage devices 44(1), . . . 44(N-1), 44(N). Such storage devices 44 may have been installed within storage drive slots 72 defined by a frame 60 of the DPE 100 through a front opening 70 of the frame 60 (also see FIG. 2).

As further shown in FIG. 4, the midplane 62 has a rear side 82(R) which faces and electrically couples with the SPs 42. Such SPs 42 may have been installed within SP slots 76 defined by the frame 60 of the DPE 100 through a rear opening 74 of the frame 60 (also see FIG. 2).

Each SP 42 includes a variety of components such as one or more caches 110, a CPU 112, an on-board network interface controller 114, and so on. In particular, the SP 42(A) (or Node A) includes cache(s) 110(A), a CPU 112(A), an on-board network interface controller 114(A), etc. Likewise, the SP 42(B) (or Node B) includes cache(s) 110(B), a CPU 112(B), an on-board network interface controller 114 (B), etc.

As mentioned earlier, at least a portion of the midplane 62 may be a planar PCB structure (e.g., layers of conductive and non-conductive material sandwiched together to provide electronic pathways). Along these lines, the midplane 62 includes midplane traces 120 (e.g., copper pathways, differential signal pairs, lanes, combinations thereof, etc.) that connect the SPs 42 to each other, and further connect the SPs 42 to the storage devices 44. One side of the planar PCB structure is the rear side 82(R) of the midplane 62 that faces toward the SPs 42 and the rear opening 74 (also see FIG. 2). Another side of the planar PCB structure is the front side 82(F) of the midplane 62 that faces opposite the rear side 82(R) and toward the storage drives 44 and the front opening 70 (FIG. 2).

As further shown in FIG. 4, the midplane 62 includes first midplane traces 122 that electrically connect the SPs 42 directly to each other. As shown schematically in FIG. 4, the first midplane traces 122 connects the SPs 42 through the rear side 82(R).

Additionally, the midplane 62 includes second midplane traces 124 that connect the storage drives 44 directly to the SPs 42. As illustrated in FIG. 4, the second midplane traces 124 are different from the first midplane traces 122 in that the ends of the first midplane traces 124 terminate on the rear side 82(R) in order to electrically connect the SPs 42 together, while the second midplane traces 124 extend from the rear side 82(R) to the front side 82(F) to electrically connect the SPs 42 with the storage drives 44. With regard to the storage drives 44, recall that the storage drives 44 are dual ported so that each storage drive 44 is accessible by both SPs 42(A), 42(B). Accordingly, the storage drive 44(1) connects directly with the SP 42(A) through a set of midplane traces 124(1)(A) and directly with the SP 42(B) through a set of midplane traces 124(1)(B). Additionally, the storage drive 44(N-1) connects directly with the SP 42(A) through another set of midplane traces 124(N-1)(A) and directly with the SP 42(B) through a set of midplane traces 124(N-1)(B). Furthermore, the storage drive 44(N) connects directly with the SP 42(A) through yet another set of midplane traces 124(N)(A) and directly with the SP 42(B) through a set of midplane traces 124(N)(B), and so on.

At this point, it should be understood that when there is an available storage drive slot 72, a NIC device 46 may be installed within that storage drive slot 72 instead of a storage drive 44. Once the NIC device 46 has been installed, the NIC device 46 provides further communications bandwidth between the SPs 42 beyond the communications bandwidth simply through the midplane 62 (e.g., see the first midplane traces 122). Alone these lines and as illustrated in FIG. 4, an existing storage drive 44(N−1) may be uninstalled (arrow 130) and replaced with a NIC device 46 (arrow 132) by way of example to provide such extra communications bandwidth between the SPs 42.

Moreover, it should be appreciated that it may be unnecessary for the DPE 100 to have a maximum number of storage drives 44. For example, the operator of the DPE 100 may have installed less than the maximum number of storage drives 44 because the particular DPE application did not require using all of the storage drive slots 72. As another example, the operator of the DPE 100 may have added an expansion enclosure for further storage drive scaling beyond that provided by the DPE 100 thus allowing one or more of the storage drive slots 72 in the DPE 100 to be used for bandwidth scaling. FIG. 5 shows details of an example NIC device 46. The example NIC device 46 includes controllers 200(A), 200(B), port traces 210(A), 210(B), port connectors (or simply ports) 220(A), 220(B), and a set of loopback traces 230. Each of the controllers 200(A), 200(B) is constructed and arranged to operate on behalf of a respective SP 42. Along these lines, when the NIC device 46 installs within the frame 60 to couple with the midplane 62, the ports 220(A), 220(B) electrically connect with second midplane traces 124 leading to the SPs 42 (also see FIG. 4).

Along these lines, when the NIC device 46 installs within a storage drive slot 72 to replace the storage drive 44(N−1) (see FIG. 6), the port 220(A) of the NIC device 46 connects with the set of section midplane traces 124(N−1)(A) leading to the SP 42(A), and the port 220(B) of the NIC device 46 connects with the other set of section midplane traces 124(N−1)(B) leading to the SP 42(B). As a result, the SPs 42 now may communicate through the midplane 62 and the NIC device 46 (FIG. 6) for additional bandwidth.

To this end, the SP 42(A) may configure/manage the controller 200(A) through the port 220(A) and port traces 210(A). Likewise, the SP 42(B) may configure/manage the controller 200(B) through the port 220(B) and port traces 210(B).

Once the controllers 200(A), 200(B) are configured to serve their respective SPs 42(A), 42(B), the controllers 200(A), 200(B) may establish a network connection through the set of loopback traces 230, and communicate through that network connection. In some arrangements, the communications between the SPs 42(A), 42(B) and the controllers 200(A), 200(B) are PCIe based (e.g., x2 PCIe gen5 lanes), and the communications between the controllers 200(A), 200(B) through the set of loopback traces 230 is Ethernet based. Further details will now be provided with reference to FIG. 7.

Figure 7:
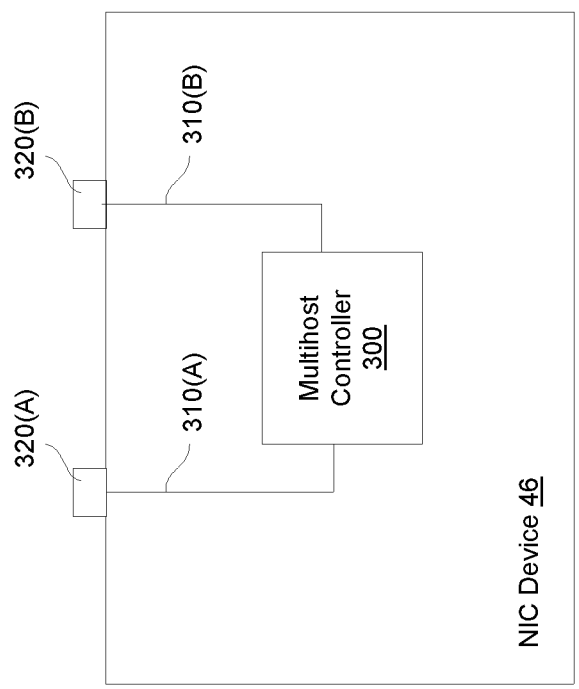
FIG. 7 is a block diagram of a second example NIC device in accordance with certain embodiments.

FIG. 7 shows another example NIC device 46 which is suitable for installation with the DPE 100 to scale bandwidth between the SPs 42. As shown in FIG. 7, the example NIC device 46 includes a multihost controller 300, port traces 310(A), 310(B), and ports 320(A), 320(B). The multihost controller 300 is constructed and arranged to internally provide Ethernet connectivity between the SPs 42(A), 42(B) based on respective PCIe signals from the SPs 42(A), 42(B) (e.g., x2 PCIe gen5 lanes to provide approximately 50G bandwidth considering overhead).

It should be appreciated that the architecture of the example NIC device 46 of FIG. 7 does not require a respective network controller for each SP 42. Rather, the SP 42(A) communicates with the multihost controller 300 through the port 320(A) and the trace 310(A), and the SP 42(B) communicates with the multihost controller 300 through the port 320(B) and the trace 310(B). Since the communications occur internally within the multihost controller 300, there is no need for any loopback connection (e.g., see the set of loopback traces 230 in the NIC device architecture of FIG. 5). Further details will now be provided with reference to FIG. 8.

Figure 8:
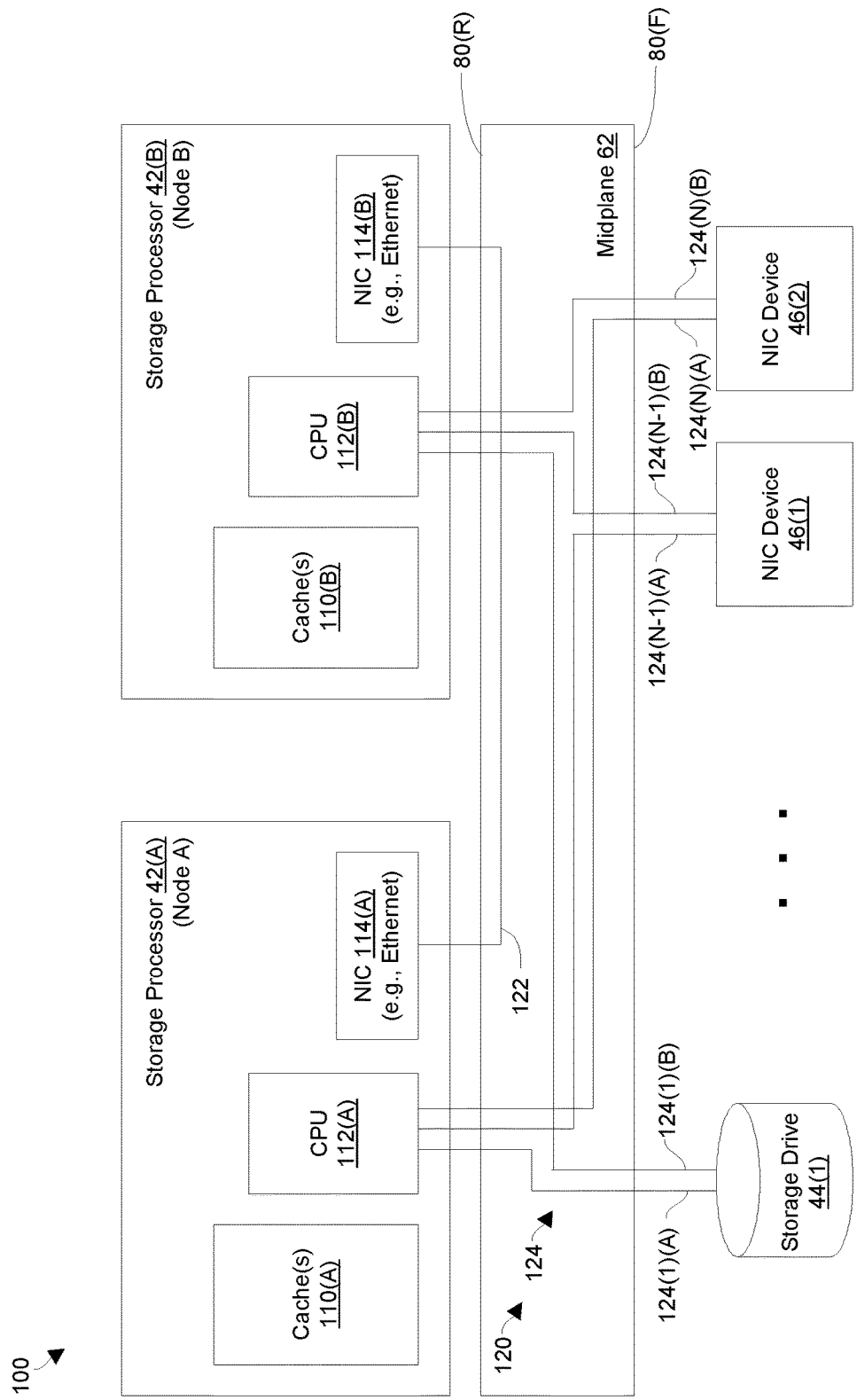
FIG. 8 is a block diagram of further scaling details in accordance with certain embodiments.

FIG. 8 shows a situation in which multiple NIC devices 46(1), 46(2) are coupled with the midplane 62 to further increase the bandwidth between the SPs 42. That is, the NIC device 46(1) is in place of the storage drive 44(N−1) and the NIC device 46(2) is in place of the storage drive 44(N) (also see FIG. 4). It should be understood that although two NIC devices 46(1), 46(2) are shown, the number of NIC devices 46 that couple with the midplane 62 may be different (e.g., three, four, etc.).

It should be understood that the different NIC devices 46(1), 46(2) may have the same architecture (e.g., all of the NIC devices 46 may have the design in FIG. 5 or in FIG. 7). Alternatively, the different NIC devices 46(1), 46(2) may mix and match in that at least one NIC device 46 has the architecture of FIG. 5 and at least one NIC device 46 has the architecture of FIG. 7.

It should be appreciated that the extra bandwidth provided by the NIC devices 46(1), 46(2), . . . may be smartly managed by the SPs 42. In accordance with certain embodiments, the SPs 42 perform a network bonding operation that creates a logical or virtual NIC resource which may then be controlled depending on the particular applications running on the SPs, data types, use cases, operating conditions, etc.

Along these lines, via identification of particular socket numbers, the various communications pathways provided through the midplane 62 may be dedicated to various types of data (e.g., host data, user data, metadata, high priority data, low priority data, etc.), sizes of data (e.g., large blocks vs. small blocks), data sources, and so on. Along these lines, go through one NIC device 46, metadata may go through another NIC device 46, and so on.

Other alternatives are suitable for use as well. For example, the traffic may be simply load balanced among the multiple pathways. As another example, based on sockets, the data from one application may be channeled through one NIC device 46, the data from another application may be channeled through another NIC device 46, and so on. Further details will now be provided with reference to FIG. 9.

Figure 9:
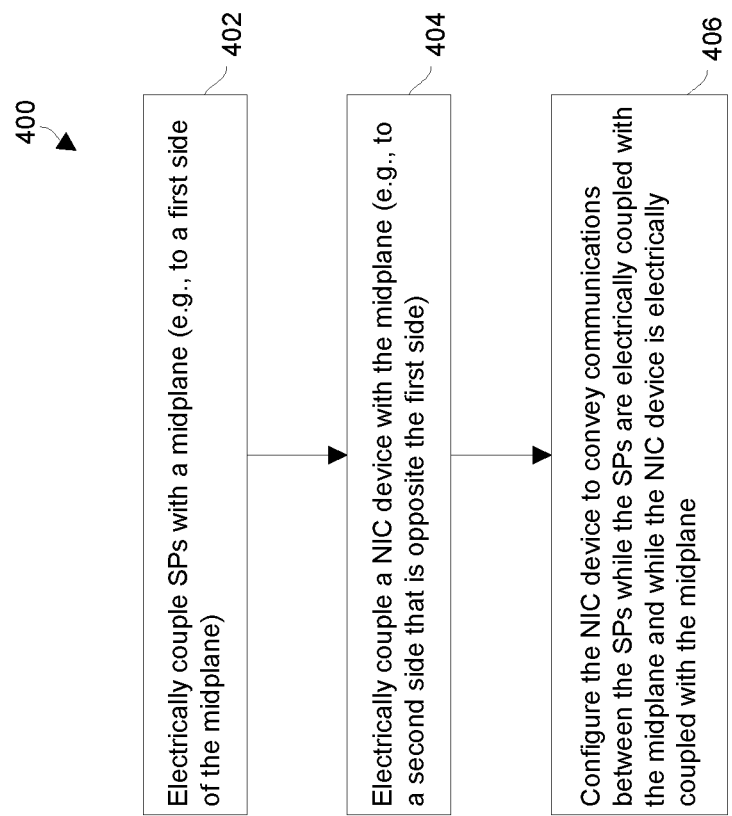
FIG. 9 is a flowchart of a procedure which is performed in order to scale midplane bandwidth between SPs via a network device in accordance with certain embodiments.

FIG. 9 is a flowchart of a procedure 400 of providing communications bandwidth between SPs. Such a procedure 400 provides extra bandwidth beyond what is simply provided by midplane pathways that connect the SPs directly to each other. Accordingly, advancements in SP technology may be harnessed because there is greater bandwidth available between the SPs.

At 402, the SPs electrically couple with a midplane. Along these lines, the SPs may install through a rear opening of a DPE to connect to a first side of the midplane (e.g., also see FIG. 2).

At 404, a NIC device electrically couples with the midplane. Along these lines, the NIC device may install through a front opening of the DPE to connect to a second side of the midplane that is opposite the first side of the midplane (e.g., also see FIG. 2).

At 406, the NIC device is configured to convey communications between the SPs while the SPs are electrically coupled with the midplane and while the NIC device is electrically coupled with the midplane. Such configuring may be involve the SPs providing PCIe signals through the midplane to the NIC device to properly set up the NIC device to serve as an additional pathway between the SPs (recall that the PCIe lanes of the midplane may also be used to connect the SPs with storage drives). In some arrangements, multiple NIC devices are installed and a network bonding operation is performed to smartly manage the multiple pathways that are provided through the midplane.

As described above, improved techniques are directed to scaling midplane bandwidth between SPs 42 via network devices 46. In particular, the SPs 42 may communicate with each other directly through first midplane traces 122 of a midplane 62, and further through second midplane traces 124 of the midplane 62 and a set of NIC devices 46. In accordance with certain embodiments, a NIC device 46 may have a form factor that is similar to that of a storage drive 44 and thus be able to insert into a storage drive slot 72 in place of a storage drive 44. For example, the NIC device 46 may operate to convey communications between the SPs 42 while the SPs 42 are electrically coupled with one side 82(R) of the midplane 62 and while a NIC device 46 is electrically coupled with the other side 82(F) of the midplane 62 for additional bandwidth.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that a high bandwidth and low latency interface is advantageous for a dual node storage system. In a DPE, it is important to leverage PCIe/NTB or ETH/RDMA direct connectivity (e.g., 50 Gb/s-200 Gb/s) through the DPE midplane without cables. In some cases, the midplane is limited to a specific throughput due to amount of lanes/PCIe generation/amount of dedicated ETH ports/controller capability. Accordingly, a higher bandwidth is desirable, without making changes to existing midplane.

In accordance with certain embodiments, a scalable shared ETH device in a solid state device (SSD) package (i.e., form factor) is provided. Along these lines, a new shared Ethernet device is packaged as a disk in a relevant form factor (e.g., U.2, EDSFF E3, etc.). Each shared Ethernet device may be made from a single controller with multi host capabilities (or alternatively, two Ethernet controllers).

In accordance with certain embodiments, each node (or SP) connects via x2 PCIe gen5 lanes to the ETH controller, allowing 50 Gb/s connectivity per device per node (bi-directional).

In accordance with certain embodiments, an internal loopback in the shared Ethernet device allows for both nodes to communicate without going through the ETH PHY.

It should be understood that the shared Ethernet device solution is scalable. That is, any number of shared Ethernet devices can be added to the DPE. Along these lines and in accordance with certain embodiments, upon installing (e.g., plugging) such a device into the DPE frame, the device is automatically identified by the Kernel. At that point, a Platform Manager (which polls all available interfaces) identifies the device as an shared Ethernet device, adds the device to a list of shared Ethernet devices with the knowledge of relevant slot number (e.g., after querying iDRAC, using a dedicated i2c interface per slot), and adds the bandwidth services provided by the device to the interconnect system bonds (e.g., a network bonding operation). It then notifies the Control Path that this slot is currently occupied by an Ethernet device so the relevant data can be presented to the user in a user interface (UI).

Device removal will be treated as other PCIe devices. Along these lines, network bonding automatically fails over. Upon removal (PCIe event+iDRAC query), the Platform Manager clean all relevant data of the device so the slot can be populated with either an SSD or a shared Ethernet device and inform the control path and the UI.

Figure 10:
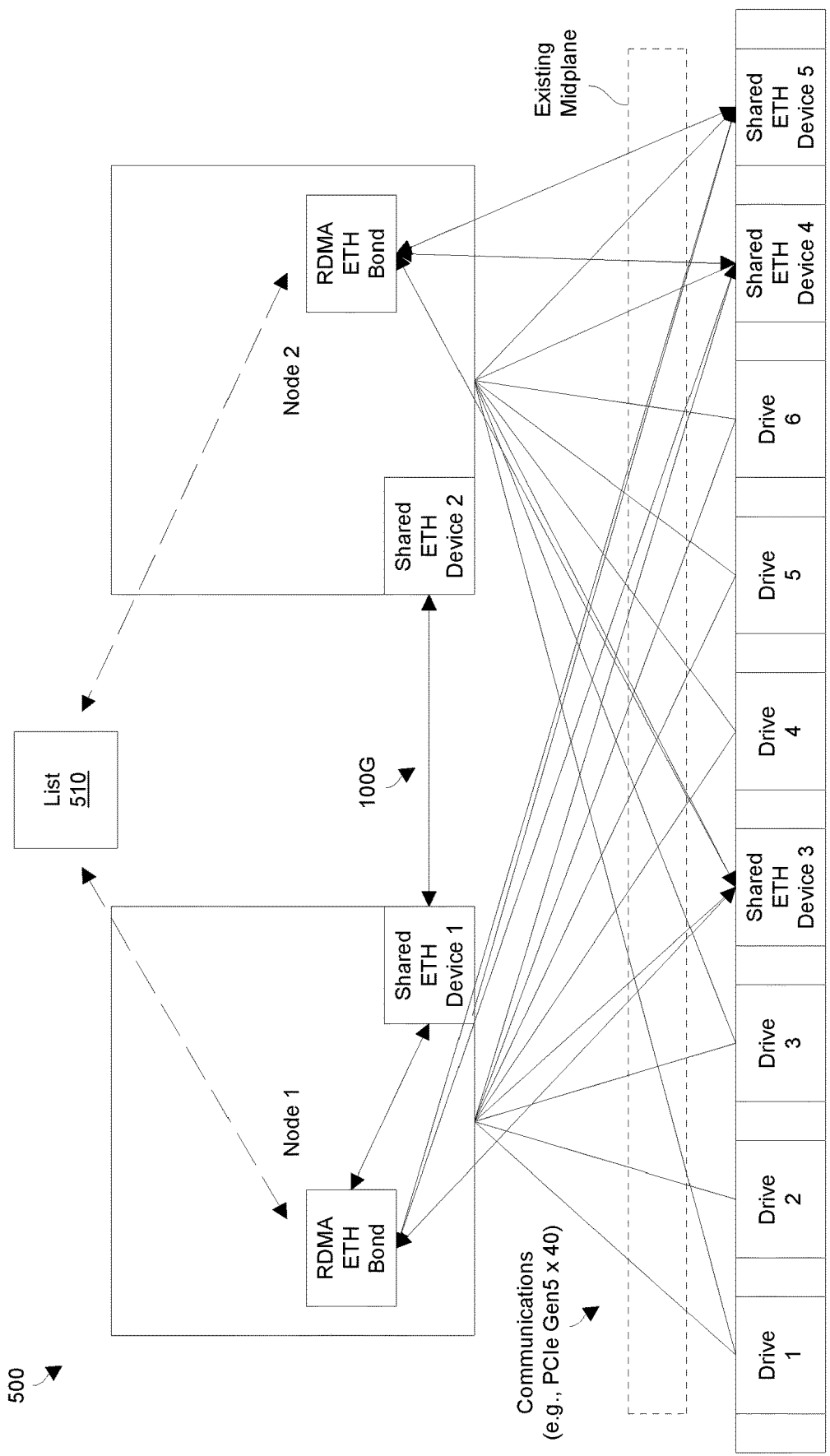
FIG. 10 is a block of an example DPE in accordance with certain embodiments.

FIG. 10 shows an example DPE configuration 500 that provides a scalable solution by aggregating bandwidth in accordance with certain embodiments. This example DPE configuration 500 includes multiple shared Ethernet devices that provide bandwidth which is managed via network bonding. To this end, the shared Ethernet devices are managed via a list 510 of shared Ethernet devices with the knowledge of relevant slot number, etc.

By way of example, the DPE configuration 500 provides nine storage drive slots. Six of the storage drive slots currently hold storage drives. Three of the storage drive slots currently hold shared Ethernet devices.

As shown in FIG. 10, there is no requirement that a shared Ethernet device install within any particular storage drive slot. Rather, any storage drive slot is available for use by a shared Ethernet device.

The midplane traces extending between the nodes (e.g., SPs) and the storage drive slots are for PCIe Gen5 x2 by way of example. Separately, other midplane traces extending between the nodes is for 100G by way of example.

Each node locally manages/monitors the operation of the shared Ethernet devices using the list 510 (e.g., see the boxes labeled RDMA ETH Bond in each node of FIG. 10). Accordingly, the bandwidth provided by the shared Ethernet devices may be dedicated to carrying different types of data, data for different operations, load balancing, and so on. As a result, there is higher bandwidth higher bandwidth through the midplane without making changes to the midplane.

Some embodiments are directed to a method of providing communications bandwidth between SPs. The method includes electrically coupling the SPs with a first side of a midplane. The method further includes electrically coupling a NIC device with a second side of the midplane that is opposite the first side of the midplane. The method further includes configuring the NIC device to convey communications between the SPs while the SPs are electrically coupled with the first side of the midplane and while the NIC device is electrically coupled with the second side of the midplane that is opposite the first side of the midplane.

Other embodiments are directed to data storage equipment that includes a midplane having a first side and a second side that is opposite the first side. The data storage equipment further includes SPs constructed and arranged to electrically couple with the first side of the midplane. The data storage equipment further includes a NIC device constructed and arranged to electrically couple with the second side of the midplane. The NIC device is configurable to convey communications between the SPs while the SPs are electrically coupled with the first side of the midplane and while the NIC device is electrically coupled with the second side of the midplane that is opposite the first side of the midplane.

In accordance with some embodiments, one or more SPs and the storage and NIC devices are constructed and arranged to electrically couple with the same side of the midplane. Nevertheless, a NIC device may replace a storage device to increase bandwidth between SPs through the midplane.

In accordance with certain embodiments, configuring the NIC device to convey communications between the SPs includes, while a first network connection is established between the SPs through a first set of traces of the midplane, establishing a second network connection between the SPs through a second set of traces of the midplane and the NIC device, the second set of traces being different from the first set of traces.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In some situations other than a data storage setting, an electronic assembly includes a midplane for connecting certain types of devices (e.g., storage drives, I/O modules, data movers, etc.). Such an electronic assembly can be augmented by installing a shared Ethernet device in place of one of the devices to enable further bandwidth between certain components. Such modifications and enhancements are intended to belong to various embodiments of the disclosure.

What is claimed is:

1. A method of providing communications bandwidth between storage processors (SPs), the method comprising:
   electrically coupling the SPs with a midplane;
   electrically coupling a network interface controller (NIC) device with the midplane; and
   configuring the NIC device to convey communications between the SPs while the SPs are electrically coupled with the midplane and while the NIC device is electrically coupled with the midplane;
   wherein the midplane resides within a drive processor enclosure (DPE); and
   wherein electrically coupling the NIC device with the midplane includes:
   installing the NIC device within a storage drive slot defined by the DPE, the storage drive slot being constructed and arranged to hold a storage drive.

2. The method as in claim 1 wherein electrically coupling the SPs with the midplane includes:
   electrically coupling the SPs with a first side of a midplane; wherein installing the NIC device includes:
   electrically coupling the NIC device with a second side of the midplane that is opposite the first side of the midplane; and
   wherein configuring the NIC device to convey communications between the SPs includes:
   while a first network connection is established between the SPs through a first set of traces of the midplane, establishing a second network connection between the SPs through a second set of traces of the midplane and the NIC device, the second set of traces being different from the first set of traces.

3. The method as in claim 1, further comprising:
   prior to installing the NIC device within the storage drive slot defined by the DPE, uninstalling a storage drive from the storage drive slot defined by the DPE.

4. The method as in claim 3 wherein the SPs include a first SP and a second SP;
   wherein the storage drive is a dual port storage device constructed and arranged to communicate with the first SP through a first port that connects with first midplane conductors and with the second SP through a second port that connects with second midplane conductors;
   wherein uninstalling the storage drive from the storage drive slot defined by the DPE includes disconnecting the dual port storage device from the first and second midplane conductors; and
   wherein installing the NIC device within the storage drive slot defined by the DPE includes connecting the NIC device to the first and second midplane conductors.

5. The method as in claim 2, further comprising:
   after the second network connection between the SPs is established, conveying Ethernet communications between the SPs through the midplane and the NIC device.

6. The method as in claim 5 wherein the two SPs includes a first SP and a second SP; and
   wherein conveying Ethernet communications between the SPs through the midplane and the NIC device includes:
   conveying first Peripheral Component Interconnect Express (PCIe) signals between the first SP and a first NIC controller of the NIC device,
   conveying second PCIe signals between the second SP and a second NIC controller of the NIC device, and
   conveying Ethernet signals through a set of NIC traces interconnecting the first NIC controller and the second NIC controller.

7. The method as in claim 5 wherein the SPs includes a first SP and a second SP; and
   wherein conveying Ethernet communications between the SPs through the midplane and the NIC device includes:
   conveying first Peripheral Component Interconnect Express (PCIe) signals between the first SP and an Ethernet multi-host controller of the NIC device, and
   conveying second PCIe signals between the second SP and the Ethernet multi-host controller of the NIC device, the Ethernet multi-host controller being constructed and arranged to internally provide Ethernet connectivity between the first and second SPs based on the first and second PCIe signals.

8. The method as in claim 2
   wherein the NIC device is a first physical network interface;
   wherein electrically coupling the NIC device with the second side of the midplane includes:
   installing the first physical network interface within a first device slot defined by the DPE; and
   wherein the method further comprises:
   installing a second physical network interface within a second device slot defined by the DPE, the second physical network interface being another NIC device that electrically couples with the second side of the midplane when the second physical network interface is installed within the second device slot defined by the DPE.

9. The method as in claim 8, further comprising:
after the first physical network interface is installed within the first device slot and the second physical network interface is installed within the second device slot, performing a network bonding operation to form a logical network interface that aggregates networking capabilities of the first physical network interface and the second physical network interface.

10. The method as in claim 8, further comprising:
prior to installing the second physical network interface within the second device slot defined by the DPE, uninstalling a storage drive from the second device slot defined by the DPE.

11. The method as in claim 8, further comprising:
after installing the second physical network interface within the second device slot defined by the DPE, uninstalling the second physical network interface from the second device slot defined by the DPE and then installing a storage drive within the second device slot defined by the DPE.

12. Data storage equipment, comprising:
a midplane;
storage processors (SPs) constructed and arranged to electrically couple with the midplane; and
a network interface controller (NIC) device constructed and arranged to electrically couple with the midplane, the NIC device being configurable to convey communications between the SPs while the SPs are electrically coupled with the midplane and while the NIC device is electrically coupled with the midplane;
wherein the midplane resides within a drive processor enclosure (DPE);
wherein the DPE defines a storage drive slot constructed and arranged to hold a storage drive; and
wherein the NIC device is constructed and arranged to install within the storage drive slot when electrically coupling with the midplane.

13. Data storage equipment as in claim 12 wherein the SPs are constructed and arranged to electrically couple with a first side of the midplane;
wherein the NIC device is constructed and arranged to electrically couple with a second side of the midplane that is opposite the first side of the midplane; and
wherein the SPs are further constructed and arranged to establish a first network connection through a first set of traces of the midplane, and establish a second network connection through a second set of traces of the midplane and the NIC device, the second set of traces being different from the first set of traces.

14. Data storage equipment as in claim 12 wherein NIC device is constructed and arranged to convey Ethernet communications between the SPs through the midplane.

15. Data storage equipment as in claim 12 wherein the NIC device is a first physical network interface;
wherein the DPE further defines another storage drive slot constructed and arranged to hold another storage drive; and
wherein the data storage equipment further comprises:
a second physical network interface constructed and arranged to install within the other storage drive slot defined by the DPE.

16. Data storage equipment as in claim 15 wherein the SPs are constructed and arranged to perform a network bonding operation to form a logical network interface that aggregates networking capabilities of the first physical network interface and the second physical network interface.

17. Data storage equipment as in claim 15, further comprising:
storage devices that are constructed and arranged to install within the storage drive slots when the physical network interfaces are uninstalled from the storage drive slots.

18. A method of providing communications bandwidth between storage processors (SPs), the method comprising:
electrically coupling the SPs with a midplane;
electrically coupling a network interface controller (NIC) device with the midplane;
configuring the NIC device to convey communications between the SPs while the SPs are electrically coupled with the midplane and while the NIC device is electrically coupled with the midplane; and
conveying Ethernet communications between the SPs through the midplane and the NIC device;
wherein the two SPs includes a first SP and a second SP; and
wherein conveying Ethernet communications between the SPs through the midplane and the NIC device includes:
conveying first Peripheral Component Interconnect Express (PCIe) signals between the first SP and a first NIC controller of the NIC device,
conveying second PCIe signals between the second SP and a second NIC controller of the NIC device, and
conveying Ethernet signals through a set of NIC traces interconnecting the first NIC controller and the second NIC controller.

19. The method as in claim 18 wherein electrically coupling the SPs with the midplane includes:
electrically coupling the SPs with a first side of a midplane;
wherein electrically coupling the NIC device with the midplane includes:
electrically coupling the NIC device with a second side of the midplane that is opposite the first side of the midplane; and
wherein configuring the NIC device to convey communications between the SPs includes:
while a first network connection is established between the SPs through a first set of traces of the midplane, establishing a second network connection between the SPs through a second set of traces of the midplane and the NIC device, the second set of traces being different from the first set of traces.

20. The method as in claim 19 wherein the NIC device installs within a drive slot defined by a drive processor enclosure (DPE); and
wherein the method further comprises:
prior to the NIC device being installed within the drive slot defined by the DPE, uninstalling a storage drive from the storage drive slot defined by the DPE.

* * * * *